United States Patent [19]

Pritzkow

[11] Patent Number: 4,521,689

[45] Date of Patent: Jun. 4, 1985

[54] MODULAR RADIATION-DETECTING ARRAY

[75] Inventor: Dennis H. Pritzkow, New Berlin, Wis.

[73] Assignee: General Electric Company, Milwaukee, Wis.

[21] Appl. No.: 469,195

[22] Filed: Feb. 24, 1983

[51] Int. Cl.³ ............................................. G01T 1/18
[52] U.S. Cl. ....................................... 250/385; 250/367
[58] Field of Search ............ 250/361 R, 363 R, 363 S, 250/366, 367, 374, 385

[56] References Cited

U.S. PATENT DOCUMENTS

| | | | |
|---|---|---|---|
| 4,272,960 | 6/1981 | Cotic | 250/385 |
| 4,306,155 | 12/1981 | Cotic | 250/385 |
| 4,345,155 | 8/1982 | Allemand et al. | 250/385 |
| 4,417,144 | 11/1983 | Hoffman et al. | 250/367 |

Primary Examiner—Janice A. Howell
Attorney, Agent, or Firm—Alexander M. Gerasimow; Douglas E. Stoner

[57] ABSTRACT

A modular radiation-detecting array composed of a plurality of detector modules having detector cells supported between upper and lower insulating substrates utilizes nut plates fastened to the insulating substrates for rigidly and releasably securing the detector modules between parallel frame members.

22 Claims, 8 Drawing Figures

MODULAR RADIATION-DETECTING ARRAY

BACKGROUND OF THE INVENTION

This invention relates to radiation-detecting arrays. More specifically, this invention relates to modular detector arrays of the type useful in medical diagnostic apparatus, for example, for detection of ionizing radiation, such as X-ray and gamma radiation.

As is known, the xenon gas detector, with respect to which the preferred embodiment of the present invention will be described, is commonly employed in medical diagnostic apparatus, such as computerized tomography (CT) scanners. Briefly, the xenon X-ray detector is made up of a plurality of spaced electrodes which are supported between pairs of parallel ceramic insulating members which are in turn secured to a metal support structure. The electrodes include bias and signal electrode plates connected to a voltage source and instrumentation for measuring the current induced in the individual electrodes by ions and photoelectrons created when the xenon gas is ionized by X-ray or gamma radiation. Xenon gas detectors suitable for use with a CT scanner are disclosed and claimed in U.S. Pat. Nos. Re. 30,644 and 4,119,853, for example, both of which are assigned to the same assignee as the present invention.

Radiation detectors, in general, and especially detectors used in computerized tomography, must detect X-ray photons efficiently and with a high degree of resolution. To obtain good spatial resolution, it is desirable to have the electrode plates spaced closely and uniformly over the entire length of the detector. It is also important for each detector cell to have identical and stable detecting characteristics. A further complication is that of the likelihood of undesirable spurious signals which may exist in such an apparatus. In such a structure where thin metal electrodes must operate in close proximity with a relatively large electrical potential between them, mechanical vibrations transmitted to the plate may significantly vary the distance between them and thus introduce small spurious current changes, known as microphonics, which in turn may cause errors in the X-ray-intensity measurements. In view of these sensitive structural requirements, the particular fabrication techniques employed have been of utmost importance in obtaining a detector structure with the desired performance characteristics.

A modular detector array suitable for use with computerized tomography apparatus is disclosed and claimed in U.S. Pat. No. 4,272,680, issued on June 9, 1981 to D. J. Cotic. This patent is assigned to the same assignee as the present invention and is incorporated herein by reference. The modular array, which will be described in greater detail hereinafter, is composed of a plurality of detector modules supported between a pair of substantially parallel support members. The detector modules are made up of a plurality of parallel plates held between two electrically insulating substrates. The individual modules are secured to the parallel-supporting members by means of threaded fasteners, thereby permitting the modules to be quickly and easily removed and replaced as necessary. Although this detector array has performed satisfactorily, a need has been recognized to provide a modular detector array having the desired performance characteristics and which features improved ease of assembly and enhanced strength of the detector module. Additionally, it has been determined that the detector array should exhibit a construction which reduces the stress imposed on the insulating substrate (typically fabricated from a ceramic material). It is, therefore, an object of the invention to provide a new and improved modular detector array having these and other advantageous features which will be more fully described hereinafter.

SUMMARY OF THE INVENTION

The detector array in accordance with the invention includes a plurality of detector modules each having a plurality of detector cells supported between upper and lower module substrates. The detector modules are in turn supported between a pair of substantially parallel, spaced-apart support members with the aid of a nut plate member secured to each of the upper and lower module substrates. A fastener is then used to rigidly and releasably attach the nut plates to the pair of support members, such that each of the nut plate members is in parallel contiguity with one of the pair of support means.

In the preferred embodiment, the detector modules are made up of a plurality of bias and signal electrodes supported between a pair of ceramic insulating substrates. Xenon gas fills the detector array so that the amount of ionizing radiation entering each detector cell is determined by measuring an electrical current induced in the corresponding signaal electrode. In an alternate embodiment, a solid-state scintillator, disposed between a pair of collimator plates, is used to detect ionizing radiation.

BRIEF DESCRIPTION OF THE DRAWINGS

The features of the invention believed to be novel are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF THE INVENTION

Figure 1:
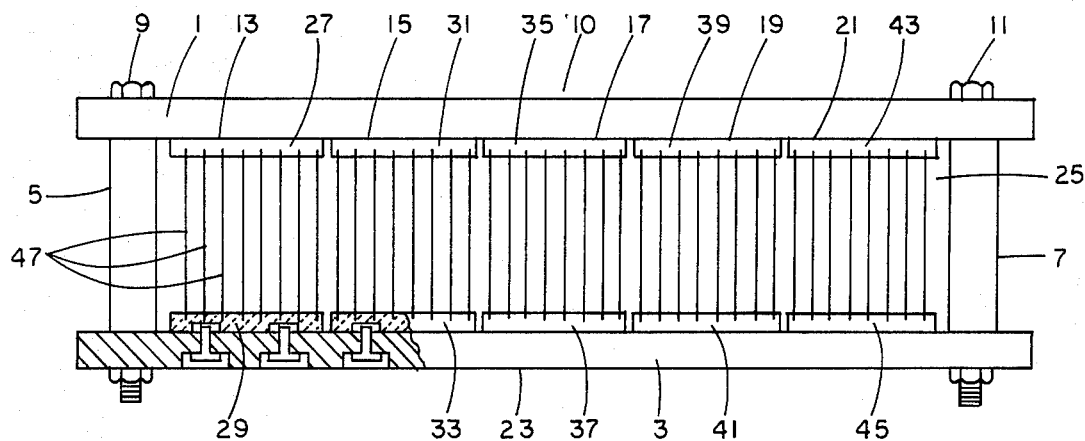
FIG. 1 is a longitudinal view, partially sectioned, of the modular detector array assembly of the prior art.
Figure 6:
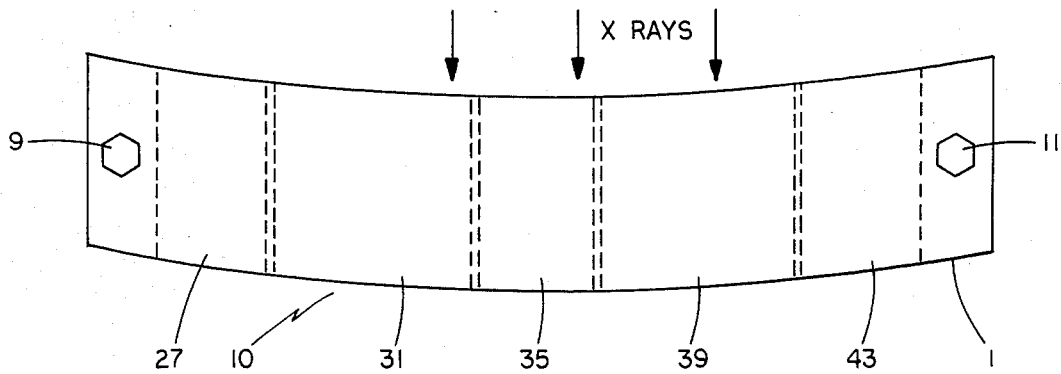
FIG. 6 depicts an alternate embodiment of the invention in which the individual modules have circumferentially varying lengths.

FIG. 1 depicts a modular detector array similar to that disclosed and claimed in the afore-identified U.S. Pat. No. 4,272,680. The array, generally designated 10, is made up of a pair of substantially parallel, spaced-apart support members 1 and 3. The support members are separated at the ends thereof by spacer elements 5 and 7 which are held in place by fasteners 9 and 11, respectively, so as to define a cavity 25 which is adapted to hold an ionizable gas such as xenon. Fasteners 9 and 11 may conveniently comprise a pair of bolts or similar fastening devices. A plurality of detector modules 13, 15, 17, 19, and 21 are disposed between support members 1 and 3 and collectively define the detector array assembly 10. The detector modules are spaced circumferentially along the curved length (as best seen in FIG. 6) of the detector array. The modules are composed of a plurality of electrode plates 47 (more fully described hereinafter) supported between upper insulating substrates 27, 31, 35, 39, and 43, and lower insulating substrates 29, 33, 37, 41, and 45, such that substrate pairs 27-29, 31-33, 35-37, 39-41, and 43-45 each define a detector module. The insulating substrates are fabricated from a machinable ceramic material, available commercially under the trademark "Macor" from Corning Glass Works, Corning, N.Y. A ceramic material is preferable for insulating substrates because of its structural stability and insulating characteristics. Support members 1 and 3 are preferably fabricated from a metal, such as stainless steel, selected such that its thermal coefficient of expansion is close to that of the insulating ceramic material used in the detector module. A stainless steel selected for use with the Macor ceramic is identified by the standard industry (American Iron and Steel Institute) designation "AISI-430."

Figure 2:
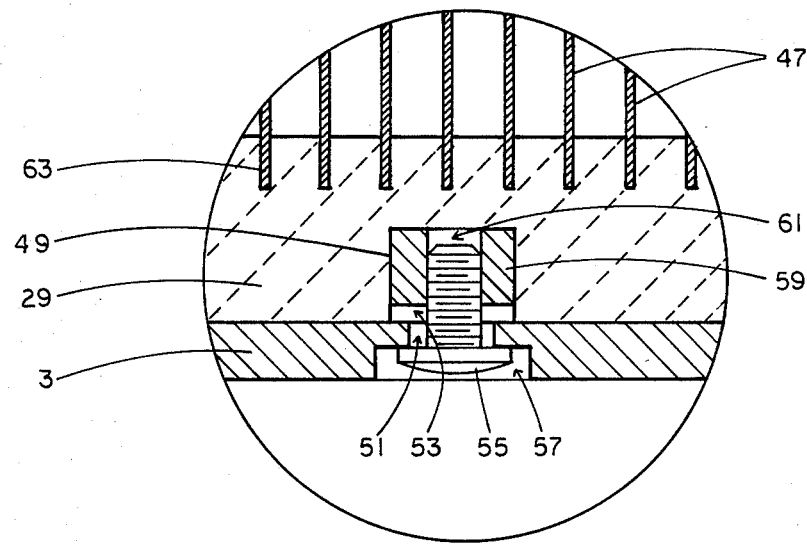
FIG. 2 is an enlarged, detailed view of the means used at a single attachment point to fasten a detector module in the detector assembly depicted in FIG. 1.

The manner in which detector modules are secured to support members 1 and 3 will be best understood if reference is made to FIG. 2 which depicts in greater detail one exemplary point of attachment. Generally, a cavity 53 is formed in the outward-facing surface of the insulating substrates, such as lower substrate 29, by means of a conventional drilling operation. A preformed insert 59 (having an outer diameter smaller than that of cavity 53) is then inserted into cavity 53 and bonded in place by means of an adhesive 49 such as that commonly known as epoxy (e.g., EA 924 available from Tech Form Labs, Los Angeles, Calif.). Alternatively, a cyanoacrylate adhesive, as described hereinafter, may also be used. Insert 59 has an aperture 61 formed therein with internal threads for threadably receiving a fastener 55 which passes through aperture 51 formed in the support members (such as support member 3, FIG. 2). In the preferred embodiment, a detector module is fastened to the support member by means of nine (9) fasteners; however, more or fewer may be used as desired. In this manner, fasteners 55 hold the detector modules securely in place. A counterbore 57 is provided in the support members so as to receive the head of fastener 55. It will be appreciated that the detector modules may be easily released and removed for the purpose of replacement by unscrewing the threaded fasteners and sliding the modules from between the upper and lower support members.

It will also be seen in FIG. 2 that electrode plates 47 are fitted into grooves 63 formed in the insulating substrates. The grooves are formed in the insulating substrates at an early stage of the fabrication process. They are substantially parallel but have a slight diversion toward the convex side of the curved detector assembly so as to accommodate a radial alignment of electrode plates 47. The electrode plates are bonded in place within the grooves with the aid of a polyurethane-based adhesive such as that commercially available under the designation "Hysol PC 15" from Dexter Corporation, Olean, N.Y.

Among the disadvantages associated with the afore-described detector array is the time-consuming assembly procedure requiring the handling of numerous small parts, such as inserts 59, which must be individually bonded in place. Furthermore, in order that the detector assembly be held in proper alignment between the upper and lower supporting members 1 and 3, the insert must be aligned so that aperture 61 thereof is perpendicular to the substrate. It will be recognized that, if the insert is not perpendicular, it will be extremely difficult, if not impossible, to precisely align the module between the support members. Additionally, the bonding operation frequently results in excess adhesive being present in aperture 61 thereby contaminating the threads of fastener 55. This results in increased difficulty when it is desired to loosen fasteners 55 to remove a detector module. The tension exerted on insert 59 when fastener 55 is tightened frequently causes the insert to "creep" toward support member 3 so that the module is no longer held firmly in place. This design may result in insert 59 actually protruding beyond the outer edge of substrate 29 such that the substrate is not contiguous with the support member. This has a degradational effect on the performance of the detector array. A still another disadvantage associated with this method of securing the detector module to the support member is that considerable stress is created in the insulating substrate at the point where the module is secured to the support member.

Figure 3:
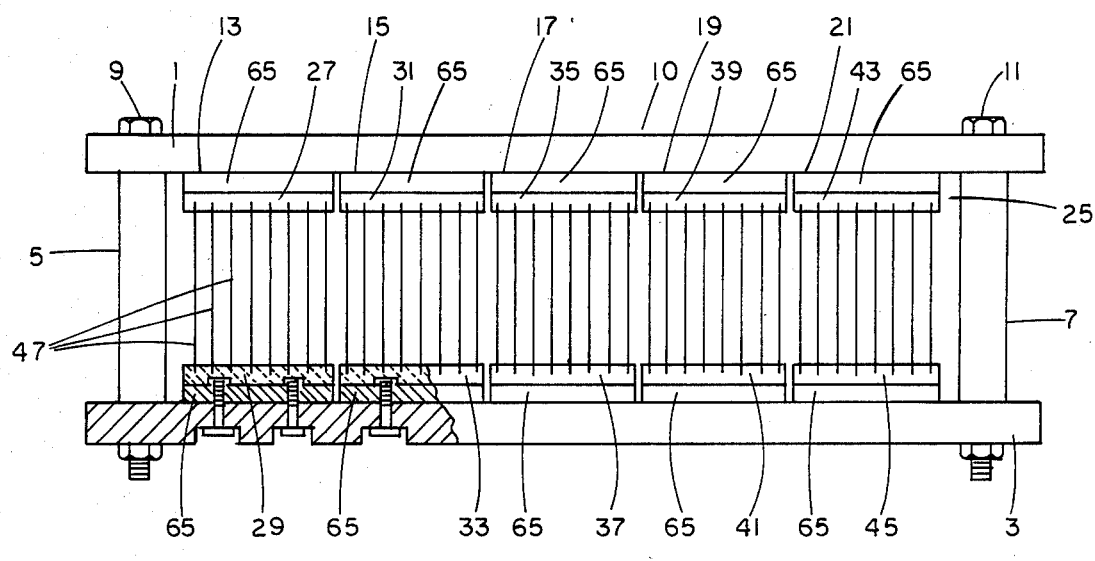
FIG. 3 is a longitudinal view, partially sectioned, of a modular detector assembly fabricated in accordance with the present invention.
Figure 4:
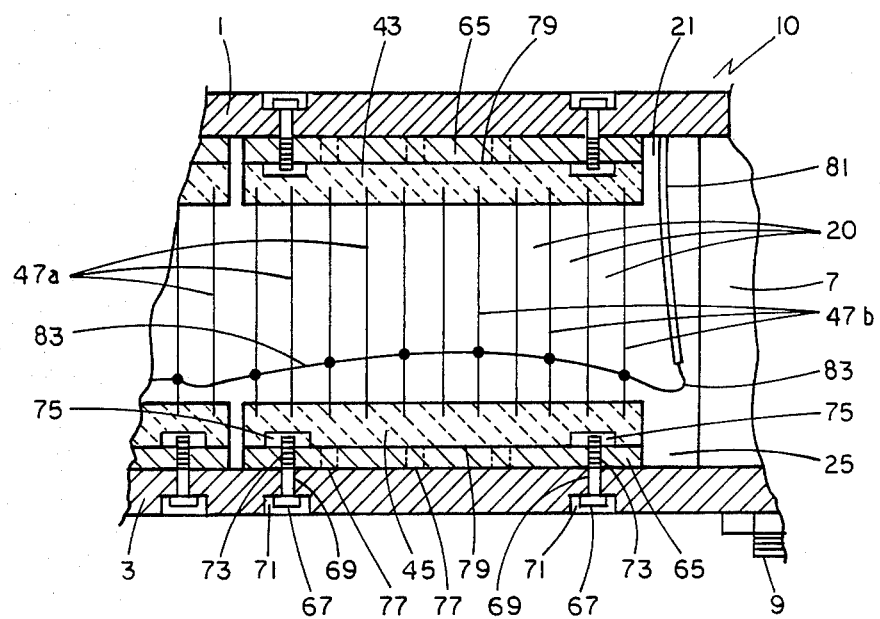
FIG. 4 is a partial sectional view of the detector assembly depicted in FIG. 3 showing in greater detail the means of attaching a module to the detector array assembly in accordance with the invention.

The module detector array in accord with the invention overcomes the aforedescribed disadvantages associated with the known detector array. The new modular detector is depicted in FIGS. 3 and 4 in which like parts are identified with the same reference numerals as in FIGS. 1 and 2. The new detector array is similar to that of FIG. 1 with the notable exception that a plurality of nut plate members 65 are provided adjacent to upper insulating substrates 27, 31, 35, 39, and 43 and lower insulating substrates 29, 33, 37, 41 and 45. As will be described in greater detail with reference to FIG. 4, the respective substrates are bonded to nut plates 65 which are then secured to support members 1 and 3 by means of threaded fasteners which pass through the upper and lower support members 1 and 3. The nut plates are preferably formed from the same material as that used for the upper and lower support members, as described hereinbefore. The important consideration with regard to the selection of a material for nut plates 65 is that it have a coefficient of thermal expansion which closely matches the thermal coefficients of expansion of the materials used for the support members and the insulating substrates.

Figure 5:
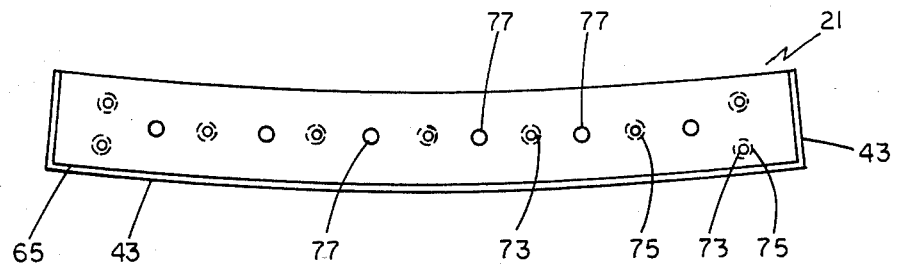
FIG. 5 is an elevational view of a single detector module showing in greater detail the structure of a nut plate member.

The detailed description of the new modular detector array will now be undertaken with respect to a single exemplary detector module, such as detector module 21, depicted in greater detail in FIGS. 4 and 5. Referring now to FIGS. 4 and 5, it will be seen that a fastener, such as threaded fastener 67, passes through an aperture 69 formed in support members 1 and 3 and threadably engages nut plates 65 which have formed therein a plurality of threaded holes 73 for receiving a corresponding plurality of fasteners. Counterbores 75 are provided in the insulating substrates to accommodate that portion of fastener 67 extending beyond nut plates 65. The counterbore also acts as a barrier preventing adhesive (used to bond the nut plates to the substrates) from contaminating threaded opening 73 so that modules may be easily and quickly replaced. A countersink 71 is also provided in support members 1 and 3 for accommodating the head of fastener 67.

FIG. 5 is an elevation view of nut plate 65 bonded to an insulating substrate, such as that designated 43. Nut plate 65 has formed therein a plurality of threaded openings 73 for receiving threaded fasteners 67. Additionally, a plurality of openings 77 are also provided in nut plate 65. Openings 77 are used to introduce a cyanoacrylate-based adhesive (commonly known as "superglue"). One such product is available commercially from the Eastman Kodak Company of Rochester, N.Y. under the designation "Eastman 910." During assembly, nut plate 65 is positioned over the insulating substrate, and a small quantity of the adhesive is introduced into each of openings 77. Due to capillary action, the adhesive spreads laterally at interface 79 (FIG. 4) between the nut plate and the insulating substrate to thereby bond the two together. Alternatively, openings 77 may be omitted if a conventional epoxy adhesive is used to bond the nut plates to the substrates. In this case, the epoxy adhesive is applied to the surfaces to be bonded and the surfaces then brought into contact. The bonding of the nut plates to the insulating substrates in this manner creates an integral assembly having increased structural strength. Another advantage accruing from the use of nut plates to secure the detector modules to the support members, as disclosed, is that the tedious task of bonding numerous inserts in place and the drawbacks attendant to their use (i.e., "creep" and alignment) are substantially eliminated. Moreover, since threaded openings 73 (FIG. 5) may be formed with precision and with relative ease, and the nut plate 65 precisely positioned on substrate 43, for example, the detector modules may be correctly and precisely positioned within the detector-array assembly to maintain parallelism of the mating surfaces.

The operation of the preferred embodiment of the detector array will now be described with reference to FIG. 4. Cavity 25 and, hence, the spaces 20 between signal electrodes 47a and bias electrodes 47b are filled with an ionizable gas, such as xenon. In the gas-ionization detector, a detector cell is defined by a pair of adjacent bias electrodes 47b such that a pair of spaces 20 is created on either side of a signal electrode 46a. The bias electrodes are connected to a source of bias potential (not shown) of about 500 volts by means of a lead 81 which is spot welded so as to create an electrical connection to a common lead 83 interconnecting bias electrodes 47b. The function of the bias electrodes is to bias the flow of photoelectrons and/or ions created by the ionizing radiation entering the detector cell toward the signal or collector electrodes 47a, inducing therein a current proportional to the intensity of the ionizing radiation. A fine electrically conductive lead (not shown) connects the signal electrodes to an externally positioned printed circuit board (not shown) in a manner more fully disclosed in the aforeidentified U.S. Pat. Nos. 4,119,853 and 4,272,680. The electrical outputs from individual electrode plates, available at the printed circuit board, are then electrically coupled to external instrumentation for processing in a well-known manner.

The new modular detector array has been described hereinabove as applying to modules of equal length. However, depending on various factors, such as the dimension requirements of the detector assembly, the various considerations in the construction and test of the modules and the subsequent installation between the support members, and the considerations for replacement of one or more of the modules, the circumferential length of the modules may be varied in a uniform or a non-uniform manner. FIG. 6 shows an alternate embodiment wherein the central module 35 is small in circumferential length. Modules 31 and 39 on either side of the central module are of greater length, while peripheral modules 27 and 43 are again of a smaller length. It will, of course, be understood that any of the various length and shape combinations can be made to accommodate the particular requirements of the system being considered. Additionally, the number of detector modules within any signle detector assembly is not significant and may be varied, upwardly or downwardly, from the five depicted in FIGS. 3 and 6 and still remain within the intent of the present invention.

Figure 7:
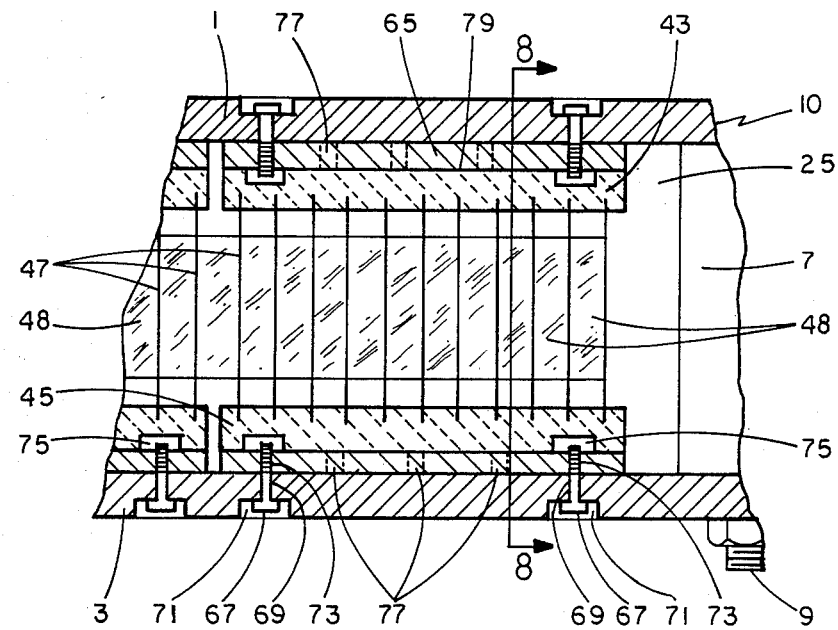
FIG. 7 is similar to FIG. 4 but depicts an embodiment of the invention in which a scintillator material is used to detect X-ray or gamma radiation.
Figure 8:
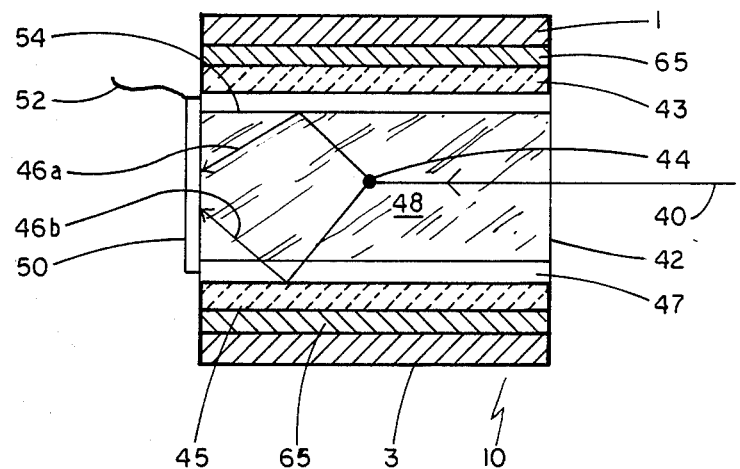
FIG. 8 is a sectional view taken along line 8—8 of the detector module illustrated in FIG. 7.

Although the preferred embodiment of the detector array has been disclosed with reference to a gas-ionization detector, the invention may also be practiced with a so-called solid-state detector. An exemplary embodiment of a single detector module of such a detector is depicted in FIGS. 7 and 8. The construction of the detector is substantially as disclosed with reference to FIGS. 3–5, with the exception that the xenon gas and electrodes are replaced by a solid-state scintillator detector material 48 positioned within a detector cell defined (in the solid-state detector) by adjacent pairs of passive collimator plates 47. The plates in this embodiment do not operate as bias and signal electrodes, but merely as collimators to prevent cross talk between adjacent detector cells. As in the gas-ionization detector, plates 47 are preferably fabricated from materials, such as tungsten and tantalum which are substantially opaque to optical and X-ray radiation.

The operation of the solid-state detector will be best understood if reference is made to FIG. 8 which is a cross-sectional view of a single detector cell taken along section line 8—8 as depicted in FIG. 7. It will be assumed that an X-ray photon 40 enters the detector through a detector front wall 42 and is absorbed at an absorption site 44 within scintillator material 48. As a result of the absorption process, the X-ray photon is converted to lower energy optical photons in the visible and near-visible wavelengths of the electromagnetic spectrum. The optical photons are radiated in all directions, but only those photons travelling toward a photodiode 50 situated on the rear wall of the detector are converted to electrical signals appearing on a diode output lead 52. The electrical signals from each diode are then processed by external instrumentation in a known manner to provide information needed to reconstruct images in the case of application of the detector array to computerized tomography, for example. It should be noted that a diode is provided to detect the optical output produced by each of scintillators 48 (FIG. 7).

The optical detection efficiency of a solid-state detector may be improved by making the interior walls of the detector cells optically reflective so as to direct toward the photodiode those optical photons which would otherwise go undetected. For example, this may be accomplished by applying an optically reflective coating to the lateral surfaces of the scintillator material so as to confine optical radiation to the interior of the material as exemplified by optical ray 46a (FIG. 8) which is reflected from a suitably treated lateral surface 54 of scintillator 48. Alternatively, the internal surfaces of a detector cell formed by the insulating substrates 43 and 45 and adjacent plates 47 may be made optically reflective to redirect optical radiation toward the photodiode, as illustrated by the exemplary optical ray 46b which is reflected from a suitably treated internal surface of substrate 45. U.S. Pat. No. 4,187,427, issued Feb. 5, 1980 to D. A. Cusano and assigned to the same assignee as the present invention, discloses and claims a scintillator detector useful in computerized tomography and which utilizes various optical coatings to enhance detector efficiency.

Scintillator materials which are useful with the detector embodiments disclosed with reference to FIGS. 7 and 8 are disclosed in U.S. Pat. Nos. 4,230,510; 4,242,221; 4,316,817; and 4,362,946; all of which issued to Cusano et al and which are assigned to the same assignee as the present invention. The scintillator materials disclosed in the above-identified patents are merely exemplary, and it is to be understood that the invention may be practiced with other scintillator materials.

From the foregoing, it will be appreciated that, in accordance with the invention, there is provided a modular detector array characterized by ease of assembly and improved strength of the detector module. The construction of the new detector also enables the detector modules to be secured to the support members without unduly stressing the insulating substrates which form part of the detector module.

While this invention has been described with reference to particular embodiments and examples, other modifications and variations will occur to those skilled in the art in view of the above teachings. Accordingly, it should be understood that within the scope of the appended claims the invention may be practiced otherwise than is specifically described.

The invention claimed is:

1. A detector array for detecting ionizing radiation comprising:
   a plurality of detector modules each having a plurality of detector cells containing a radiation-detecting medium, said detector cells being supported between upper and lower insulating substrates;
   a pair of substantially parallel support members in spaced-apart relationship for supporting therebetween said plurality of detector modules;
   nut plate means secured to upper and lower insulating substrates of each of said plurality of detector modules; and
   fastening means for rigidly and releasably attaching said detector modules to said pair of support members, such that each of said nut plates is in parallel contiguity with one of said support members.

2. The detector array of claim 1 wherein said detector modules comprise:
   a plurality of collimator plates which are substantially opaque to optical and ionizing radiation;
   a scintillator material disposed between said collimator plates for converting impinging ionizing radiation to optical wavelength radiation; and
   photodetector means for converting optical wavelength radiation to electrical current indicative of the intensity of the ionizing radiation.

3. The detector array of claim 2 wherein said fastening means comprises a plurality of threaded fasteners, each passing through one of said pairs of support members and threadably engaging said nut plate means.

4. The detector array of claim 3 wherein said insulating substrates each have a counterbore formed opposite of where said fasteners engage said nut plate means permitting said fastener means to protrude thereinto after passing through said nut plate means.

5. The detector array of claim 2 wherein said nut plate means is bonded to the corresponding insulating substrates by an adhesive material.

6. The detector array of claim 5 wherein each of said nut plate means has holes formed therein for introducing the adhesive for bonding said nut plate means to said insulating substrates so as to form an integral assembly.

7. The detector array of claim 2 wherein said support members and said nut plate means are selected to have similar coefficients of thermal expansion.

8. The detector array of claim 7 wherein said insulating substrates comprise a ceramic material.

9. The detector array of claim 8 wherein said support members are fabricated from a metallic material.

10. The detector array of claim 9 wherein said ceramic and metallic materials are selected to have similar coefficients of thermal expansion.

11. The detector array of claim 2 wherein said plurality of detector modules are arranged between said support members to have an arcuate configuration, and wherein the circumferential length of one of said plurality of modules is less than that of at least one other of said plurality of modules.

12. The detector array of claim 1 wherein said detector modules each comprise a pluraity of electrodes.

13. The detector array of claim 12 wherein said radiation-detecting medium comprises xenon gas.

14. The detector array of claim 12 wherein said fastening means comprises a plurality of threaded fasteners, each passing through one of said pairs of support members and threadably engaging said nut plate means.

15. The detector array of claim 14 wherein said insulating substrates each have a counterbore formed opposite of where said fasteners engage said nut pate means permitting said fastener means to protrude thereinto after passing through said nut plate means.

16. The detector array of claim 12 wherein said nut plate means is bonded to the corresponding insulating substrates by an adhesive material.

17. The detector array of claim 16 wherein each of said nut plate means has holes formed therein for introducing the adhesive for bonding said nut plate means to said insulating substrates so as to form an integral assembly.

18. The detector array of claim 12 wherein said support members and said nut plate means are selected to have similar coefficients of thermal expansion.

19. The detector array of claim 18 wherein said insulating substrates comprise a ceramic material.

20. The detector array of claim 19 wherein said support members are fabricated from a metallic material.

21. The detector array of claim 20 wherein said ceramic and said metallic materials are selected to have similar coefficients of thermal expansion.

22. The detector array of claim 12 wherein said plurality of detector modules are arranged between said support members to have an arcuate configuration, and wherein the circumferential length of one of said plurality of modules is less than that of at least one other of said plurality of modules.

* * * * *